(12) United States Patent
Beckman

(10) Patent No.: US 11,122,432 B2
(45) Date of Patent: Sep. 14, 2021

(54) ACCESS TO WIRELESS NETWORKS BASED ON USER BEHAVIOR

(71) Applicant: Christopher V. Beckman, Los Angeles, CA (US)

(72) Inventor: Christopher V. Beckman, Los Angeles, CA (US)

(*) Notice: Subject to any disclaimer, the term of this patent is extended or adjusted under 35 U.S.C. 154(b) by 0 days.

(21) Appl. No.: 16/660,788

(22) Filed: Oct. 22, 2019

(65) Prior Publication Data
US 2020/0053565 A1    Feb. 13, 2020

Related U.S. Application Data

(63) Continuation-in-part of application No. 15/465,548, filed on Mar. 21, 2017, now Pat. No. 10,452,589, which is a continuation-in-part of application No. 13/840,471, filed on Mar. 15, 2013, now Pat. No. 9,600,435.

(51) Int. Cl.
| | |
|---|---|
| *H04W 12/08* | (2021.01) |
| *G06F 13/36* | (2006.01) |
| *H04W 76/15* | (2018.01) |
| *H04W 12/63* | (2021.01) |
| *H04W 12/68* | (2021.01) |
| *H04W 12/76* | (2021.01) |
| *H04W 84/18* | (2009.01) |

(52) U.S. Cl.
CPC ............ *H04W 12/08* (2013.01); *G06F 13/36* (2013.01); *H04W 12/63* (2021.01); *H04W 12/68* (2021.01); *H04W 12/76* (2021.01); *H04W 76/15* (2018.02); *H04W 84/18* (2013.01)

(58) Field of Classification Search
CPC ............ H04W 12/08; H04W 12/0052; H04W 12/00503; H04W 12/00508; H04W 76/15; H04W 12/76; H04W 12/63; H04W 12/68; H04W 84/18; G06F 13/36
See application file for complete search history.

(56) References Cited

U.S. PATENT DOCUMENTS

| | | | |
|---|---|---|---|
| 2013/0231130 A1* | 9/2013 | Cherian | H04W 4/025 455/456.1 |
| 2013/0295962 A1* | 11/2013 | Manroa | H04W 64/00 455/456.3 |
| 2016/0226842 A1* | 8/2016 | Mower | H04L 63/0492 |
| 2016/0345208 A1* | 11/2016 | Gates | G06Q 10/02 |
| 2018/0018593 A1* | 1/2018 | Benavides | G06Q 10/02 |
| 2019/0104411 A1* | 4/2019 | Hotchkiss | H04W 12/06 |

* cited by examiner

*Primary Examiner* — Nimesh G Patel

(57) ABSTRACT

New techniques for establishing communications connections for computer systems are provided. In some aspects, a new technique for rapidly establishing a uniform, secure wireless peripheral device network is provided. In some embodiments of the invention, multiple secure wireless networks are established based on identifying users' by their physical location within a room or other area.

20 Claims, 13 Drawing Sheets

ACCESS TO WIRELESS NETWORKS BASED ON USER BEHAVIOR

CROSS-REFERENCE TO RELATED APPLICATION

This application is a continuation-in-part of U.S. patent application Ser. No. 15/465,548, filed Mar. 21, 2017, now U.S. Pat. No. 10,452,589, titled "Establishing Wireless Networks by Physical Connection," which, in turn, is a continuation-in-part of Ser. No. 13/840,471, filed Mar. 15, 2013, now U.S. Pat. No. 9,600,435, titled "Peripheral Device and Connection Techniques." The contents of each of the above applications are incorporated herein by reference in their entireties.

FIELD OF THE INVENTION

The present invention relates to the field of devices and techniques for establishing wireless networks with computer hardware.

BACKGROUND

Computer peripheral devices ("peripherals") are hardware that extend the capabilities of a computer system without permanently altering its architecture. Peripherals include devices that accept output from the computer, communicate input, and both.

Recently, peripherals have emerged that are specialized for use with small, portable computers, such as smartphones, tablets, and other personal digital assistants (collectively, "PDAs"). Some of these devices interact with the PDA through dedicated input/output connectors, such as USB ports, or other data communications ports, and compatible pins or plugs. Such ports, pins and plugs are various and usually of a specific format which may be proprietary, such as High Definition Multimedia Interface ("HDMI"), Universal Serial Bus ("USB"), and the 3.5 millimeter telephone jack ("phone jack"), and the Apple Inc.'s Lightning, each of which may assist in transferring data between networked devices with computer hardware. For example, the company Square, Inc. has developed a magnetic strip reader that uses the phone jack to process electronic transactions through a variety of PDAs. Other companies have developed a variety of peripherals including additional and different sensors than the PDA alone, using such a port, pin or plug.

As another alternative to hard-wired connections, some peripherals utilize local wireless networks to establish communications between devices. These may be termed personal area networks ("PAN"), although some definitions of personal area networks may include hard-wired networks. Wireless personal area networks ("PAN") have been in use at least since the advent of BlueTooth, in 1994, created by Ericsson.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of the inventor's own discoveries and work and work results. Thus, these disclosures should not be construed as an admission with respect to prior art or the state of the art.

SUMMARY OF THE INVENTION

New systems, devices and methods for establishing communications connections for computer peripheral devices are provided. In some embodiments of the invention, new forms of Audio-Jack-connecting peripheral devices are disclosed, which permit the continued access to the phone jack of a PDA for purposes other than communication with the peripheral device—such as, for communication with other peripheral devices—while using the Audio Jack as a gripping piece for physical mounting. In some embodiments, a void within a connecting pin or strip permits direct access to at least a part of the PDA's Audio Jack, minimizing the footprint of the peripheral device, along with additional beveling, shaping and flush-mounting.

In some embodiments, a new technique for rapidly establishing a uniform, secure wireless peripheral device network for such a peripheral device is provided. In some embodiments, such a peripheral device has an extremely low profile, omitting the mounting pin or strip and, instead, gripping another part of the PDA housing (such as the front of the PDA housing) with a small overhang.

In some embodiments of the invention, a secure peripheral device network is activated by physical docking and/or interlocking, and based on the successful establishment of a wired connection. In some embodiments, a secure, encrypted peripheral device network is established by a system in response to terminating such a wired network connection, easing the transition from wired to wireless connection status, and easing the creation of a wireless network, generally. The resulting wireless networks may also be more secure than other forms of wireless networks, using a new form of physically-isolated negotiation for encryption keys, based on physical features and limits of a peripheral device interface.

In some embodiments, by contrast, a secure peripheral device network is activated without any use of a wired network connection, based on proximity and location information, as determined by one or more control systems. In some such embodiments, such a proximity is a precise location of a peripheral device. In some embodiments, such a proximity is a precise location of a user. In some such embodiments, a secure peripheral device network is established based on determinations based on that location, such a classification of the user inferred from her, his or its location.

Canons of Construction and Definitions

The following terms shall have the following meanings, significance and senses, in addition to their ordinary and specific meanings, significances and senses in general usage and within the technological field(s) in which they are used.

"Personal Area Network," or "PAN," in addition to its ordinary meaning and special meaning in the arts to which it relates and that may be relevant to this application, means a communications network and/or related encryption routines and/or protocols, if any, for establishing a network for local communication.

"Peripheral Device Network," in addition to its ordinary meaning and special meaning in the arts to which it relates and that may be relevant to this application, means a communications network and/or related encryption routines and/or protocols, for establishing a local network for communication between peripheral devices and/or computer systems, of nature(s) and type(s) further described elsewhere in this specification. By way of guidance for the reader, and not for restriction of all meanings, in some embodiments, the precise location, fastening condition, section position or forces, orientation, distance(s), and mutual contact type(s), among other physical constraints, of a peripheral device is detected by a computer system (or vice versa), triggering the creation of a secure, shielded network for communications between such a device and the computer system.

"Audio Jack," in addition to its ordinary meaning and special meaning in the arts to which it relates and that may be relevant to this application, means a 3.5 millimeter phone or audio connecting port, or other jack or communications port used by peripheral devices for PDAs and other computer systems to expand their interactions and/or capabilities.

"Personal Digital Assistant," or "PDA," in addition to its ordinary meaning and special meaning in the arts to which it relates and that may be relevant to this application, means a portable or other computer hardware and/or software system, which may comprise, but is not limited to, a personal digital assistant or smartphone.

"GUI," in addition to its ordinary meaning and special meaning in the arts to which it relates and that may be relevant to this application, means a graphical user interface, or user interface incorporating graphical elements, which is a type of user interface.

"UI," in addition to its ordinary meaning and special meaning in the arts any device, means a user interface, or any object, method or technique comprising controls assisting or enabling a user to carry out or affect the performance, actuation, parameters, or other aspects of the invention, or any part thereof. A UI comprises, but is not limited to, controls or virtual controls, or a set thereof, represented by computer hardware and software (for example, actuable visual representations of tools by a computer system on a computer screen).

Where any term is set forth in a sentence, clause or statement ("statement"), each possible meaning, significance and/or sense of any term used in this application should be read as if separately, conjunctively and/or alternatively set forth in additional statements, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

These and other aspects and examples of the invention will be made clearer below, in other parts of this application. This Summary, the Abstract, and other parts of the application are for ease of understanding only, and no part of this application should be read to limit the scope of the invention, whether or not it references matter in any other part.

It should be noted that the figures referenced above are examples only of the wide variety of different embodiments falling within the scope of the invention, as will be readily apparent to those skilled in the art. Thus, any particular size(s), shape(s), proportion(s), scale(s), material(s), device(s), or number(s) of elements pictured are illustrative and demonstrative, and do not limit the scope of invention, as will be so readily apparent.

DETAILED DESCRIPTION OF THE INVENTION

The example embodiments of the invention presented herein are directed to new devices, systems, methods and other techniques related to the establishment of wireless and other networks, which are now described herein. This description and the particular embodiments set forth herein are examples of broader principles of the invention, and do not limit the application and scope of the invention presented herein. In fact, after reading the following description, it will be apparent to one skilled in the relevant art(s) how to implement the following example embodiments in a wide variety of alternative embodiments.

As mentioned above, the use of a particular gender, number or order of elements or steps should, similarly, not be considered to limit the scope of the invention, and, with respect to each such element or step, the description should be understood to also set forth, separately and in addition, each other possible gender, number, order and configuration of such element(s) and step(s).

Figure 1:
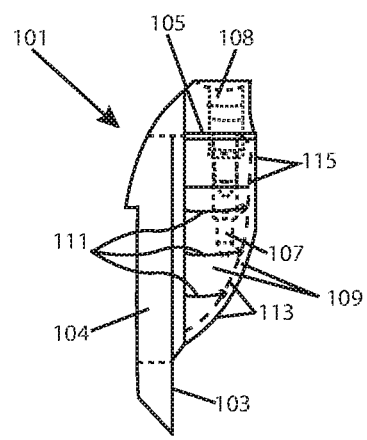
FIG. 1 is a side view of an example peripheral device system which may access the phone jack of a PDA, but which also provides external, additional access to the phone jack of the PDA, in accordance with some embodiments of the invention.

FIG. 1 is a side view of an exemplary peripheral device system 101 which may access the Audio Jack of a PDA, but which also provides external, additional access to the Audio Jack of the PDA, in accordance with aspects of the present invention. Among other advantages, device 101 maintains a low additional profile when installed onto a PDA, abutting the housing of the PDA on two sides: vertical inward-facing side 103 and horizontal inward-facing side 105. When device 101 is properly installed on a PDA, each of sides 103 and 105 is preferably pressed at least partially flush against the outer housing of the PDA, and device 101 adds a relatively small additional width over a broad area of the PDA's outer housing, in most circumstances, next to those flush regions of contact. In other words, device 101 maintains a low profile against the housing of a PDA onto which it is installed. That low additional profile is highlighted in the present, side view, where device 101 is at its thinnest. For example, the width of a main body 104 of device 101 (from the side view, pictured) is preferably no more than ½ of the PDA's width from a side perspective, and, even more preferably, is no more than ⅓ or ¼ of the PDA's width. Also preferably, main body 104 is substantially thinner than both the vertical and horizontal width of the remaining sections of the device, by at least the same proportions, and, preferably, an even more differential ratio (although not pictured).

To install device 101, a user may insert interfacing strip or pin 107 into an Audio Jack of a PDA, until device 101 snaps into place, with strip/pin 107 fully inserted into the Audio Jack. Strip/pin 107 preferably guides the installation of device 101 as it inserts into, and interlocks with, an Audio Jack, maintaining the installed state of device 101 until a user disengages it from a PDA. Strip/pin 107 also preferably maintains functional electronic communication between device 101 and the Audio Jack, allowing device 101 and the PDA to maintain input and output communications. However, strip/pin 107 also preferably maintains a hollow void within itself and, preferably, in at least part of the Audio Jack, and, in any event, permits the at least partial insertion of, and enabling communications for the PDA and/or device 101 with, a phone plug (for example, allowing communication with a separate audio device, such as a set of headphones, or other device) though its own auxiliary Audio Jack 108. Different preferred forms for a strip/pin such as 107 are discussed in greater detail below, in reference to FIGS. 7-9.

Device 101 includes a main body 104 that may house or otherwise at least partially comprise a variety of different peripheral device components, to extend the capability of the PDA by electrically connecting them to the PDA through the Audio Jack, or otherwise as discussed in this application. Some such device components may be actively powered by the PDA, for example, also through the Audio Jack, or through transmitted, ambient power, while other such device components may have their own, local power source, which may also be within the main body 104. For example, main body 104 may house an external modem, sensor, display, other actuator, or sets of such components, and connect them to the PDA allowing them to communicate with the PDA, and vice versa. In some variations, the device 101 may be capable of carrying out functions both while connected to the PDA, and when detached, and may variably sync data with the PDA, for example, when installed on the PDA, or at intervals or other selected times. In some such variations, an external power and other function extender and auxiliary protective housing may be variably coupled with the device 101, when device 101 is not presently installed on a PDA or coupled to another device. Such function extender and auxiliary protective housings are discussed below, in reference to FIG. 2. However, even if no such auxiliary protective housing is included, a self-contained variable housing may be included in device 101 itself. For example, variably-extending, force-biased protective tabs 109 may variably deploy from slots variably storing them (not pictured) in main body 104, when device 101 is uninstalled from a PDA, and surround or at least partially otherwise protect strip/pin 107. Preferably, force-biasing tends to push protective tabs 109 as shown by force arrows 111, but, owing to forward-leading slopes 113 (as device 101 is installed onto a PDA), tabs 109 are depressed into the slots within the main body 104 when device 101 is installed, keeping them out of the way for installation, and assisting in holding device 101 in place when installed, with the aid of flat, gripping surfaces 115, which may at least partially comprise an elastomeric or otherwise gripping surface or texture. The outward surfaces of device 101 are generally sloped, creating a more streamlined and less noticeable profile when installed in the PDA.

Although device 101 is shown extending the abilities of a PDA or smartphone ("PDA") through an Audio Jack, it should be understood that device 101 may be used to extend the abilities of a wide variety of alternative computer and computing device systems and networks, and a wide variety of plugs, pins, jacks and other communications or other receiving terminals, ports and fastening sections may also be used to carry out aspects of the present invention, some, but not all, of which will be discussed in greater detail, below.

Figure 2:
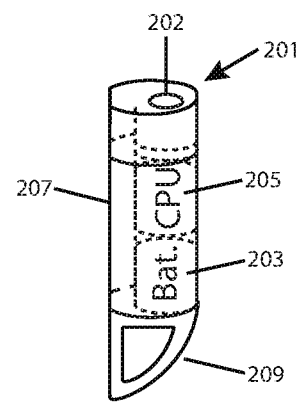
FIG. 2 is a side view of an example function extension component and auxiliary protective housing, which may be variably coupled with a variably connectable peripheral device for a PDA, such as the peripheral device discussed in reference to FIG. 1, in accordance with some embodiments of the invention.

FIG. 2 is a side view of a function extension component and auxiliary protective housing 201, which may be variably coupled with a variably connectable peripheral device for a PDA, such as device 101, discussed above. To install component and auxiliary protective housing 201 onto device 101 (and thereby couple the two) a user may thread component and auxiliary protective housing 201 over strip/pin 107 through Jack 202. Through that interface, between Jack 202 and strip/pin 107, device 101 and component and auxiliary protective housing 201 may then communicate via a (preferably) wired connection to accomplish some extension of function, although, in some embodiments, communications may also be achieved by other means, such as with local wireless networks.

Among other extensions of function, component and auxiliary housing 201 may provide off-board power for device 101, for example, via a battery or other power source 203. In addition, component and auxiliary housing 201 may include computer hardware, such as a central processor 205, and any number of additional antenna(s), sensor(s), display(s), other actuator(s), or set(s) of such component(s), and connect them to device 101 allowing them to communicate with device 101, and vice versa. In some embodiments, component and auxiliary housing 201 may be, itself, connected to another computer system (by a wired or wireless communications and/or power delivering connection), and may extend capabilities of that computer system to component and auxiliary housing 201 and/or device 101. When installed onto (coupled with) device 101, the outer surface 207 of component and auxiliary housing 201 may variably interlock with or otherwise interface with a structural component of device 101 in addition to surrounding strip/pin 107, to provide greater rigidity and structural protection of strip/pin 107. Outer surface 207 may comprise a lightweight, sufficiently strong material to better protect strip/pin 107 from environmental insult. Other functional extensions, and extension-enabling devices, may also be comprised in component and auxiliary protective housing 201, such as a keychain loop 209.

Figure 3:
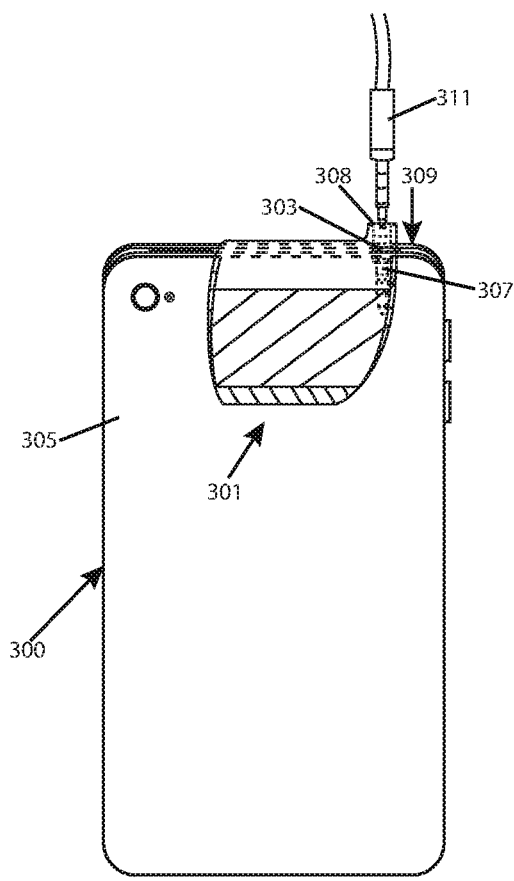
FIG. 3 is a rear view of an example PDA with an example peripheral device system, such as the example device system discussed with reference to FIG. 1, above, installed into and able to communicate with the PDA through its Audio Jack, in accordance with embodiments of the present invention.

FIG. 3 is a rear view of a PDA 300 with a peripheral device system 301, such as the device system discussed with reference to FIG. 1, above, installed into and able to communicate with the PDA through its Audio Jack 303, in accordance with aspects of the present invention. Compared to the viewing angle of FIG. 1, FIG. 3 has been rotated 90 degrees counter-clockwise, on the downward vertical axis. From this rear view, the device 301 has its largest profile, but is still modestly sized in comparison to the PDA (preferably occupying no more than 75 to 90% of the PDA's width), and generally lays flat against the side 305 of the outer housing of the PDA that is closest to the viewer (visible, facing the positive Z-axis, out-of-the-page of the figure). In the installed position depicted, device 301's Audio Jack-interfacing and mounting strip or pin 307 is mounted into Audio Jack 303, and maintains electronic communication capabilities between the PDA 300 and the device 301, as explained with respect to FIG. 1, between strip/pin 107 and device 101. A horizontal inner side of the housing of device 301 (not pictured, but shown as 105 in FIG. 1) abuts the top edge 309 of the PDA, in which Audio Jack 303 is embedded and opens from. One may also see the relative extension of the device 301/101's own auxiliary Audio Jack 308, which extends upward from the PDA and the remainder of device 301/101, in order to create the necessary space to receive a phone plug, an example of which is shown as 311, and to provide discrete, insulated electronic connections for each electronic lead of the phone plug to discrete, insulated electronic contacts of the device 301 and/or the PDA 300's Audio Jack 303. In turn, the strip/pin of device 301 may, itself, provide discrete, insulated electronic connections and discrete electronic leads to discrete, insulated electronic contacts of the PDA Audio Jack 303.

Figure 7:
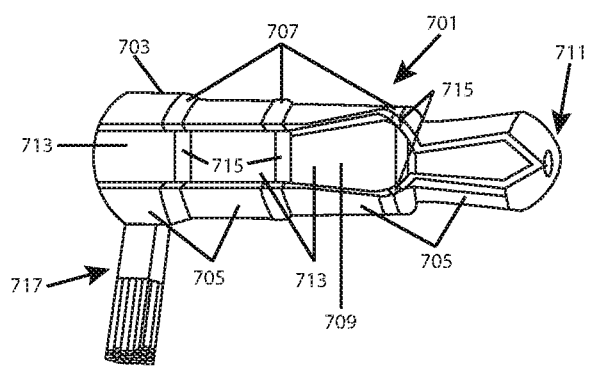
FIG. 7 is a side and partial cutaway view of an example embodiment of a pin or strip of a peripheral device that may aid such a device in variably mounting to, and establishing electronic communications with, a PDA or other portable computing device with a complementary Jack, in accordance with embodiments of the present invention.
Figure 8:
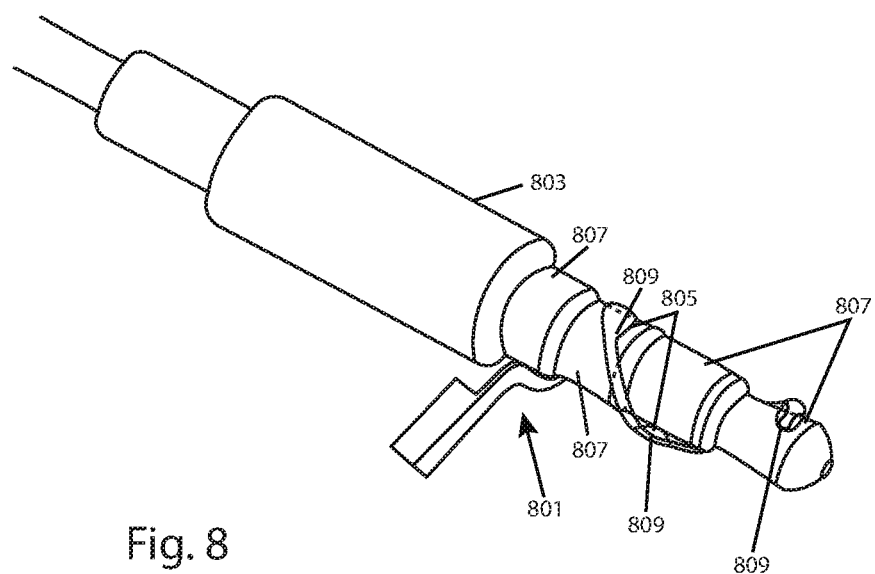
FIG. 8 is a perspective view of another example embodiment of a pin or strip of a peripheral device that may aid such a device in variably mounting to, and establishing electronic communications with, a PDA or other portable computing device with a complementary Jack, in accordance with embodiments of the present invention.
Figure 9:
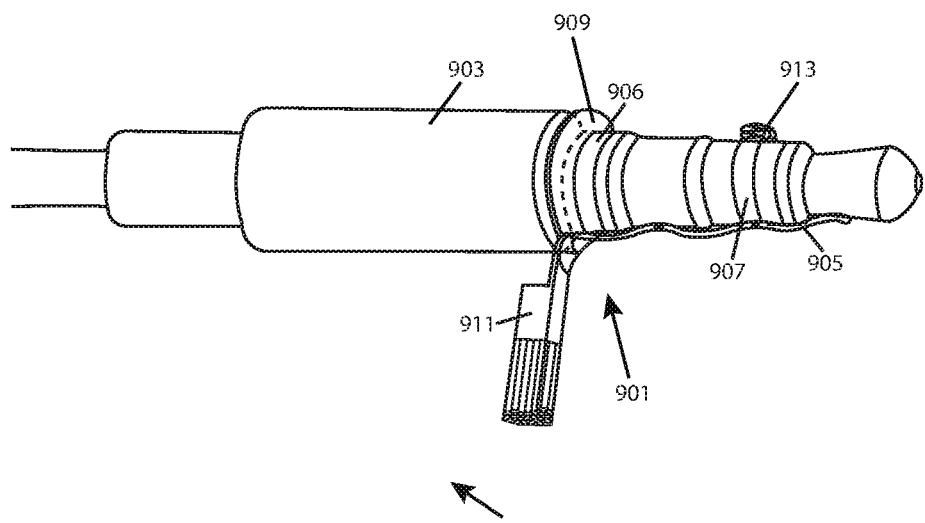
FIG. 9 is a perspective view of another example embodiment of a pin or strip of a peripheral device that may aid such a device in variably mounting to, and establishing electronic communications with, a PDA or other portable computing device with a complementary Jack, in accordance with embodiments of the present invention.

As will be discussed in greater detail below, depending on the tolerances between particular Audio Jacks and phone plugs, the simultaneous insertion of a part of the plug into a strip or pin, such as that shown as 307, and also within an Audio Jack may be difficult and costly to achieve from a manufacturing standpoint, as a universal approach for a wide variety of PDAs. Nonetheless, options for achieving such space-saving, at least partial simultaneous insertion of 307 and 311 are depicted in FIGS. 7-9. In another embodiment, however, discussed immediately below, that simultaneous insertion is not necessary to obtain some objectives of the present invention.

Figure 4:
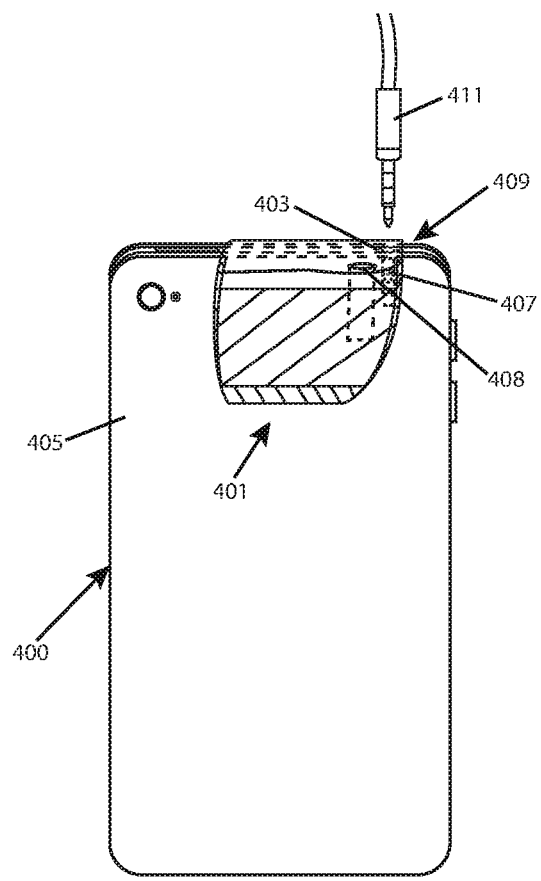
FIG. 4 is a rear view of an example PDA similar to that depicted in FIG. 3, demonstrating alternate examle embodiments of a peripheral device system, installed into and able to communicate with the PDA through its example Audio Jack, in accordance with embodiments of the present invention.

FIG. 4 is a rear view of the same PDA as that depicted in FIG. 3 (now 400) with an alternate embodiment of a peripheral device system 401, installed into and able to communicate with the PDA through its Audio Jack 403, in accordance with aspects of the present invention. As an alternative also mentioned above, in this embodiment, the at least partially simultaneous insertion of a phone plug, such as the example pictured as 411, into the inside of both the strip/pin (now 407) and Audio Jack (now 403) is not necessary. Instead, the device 401 includes an auxiliary jack 408 at a neighboring location, separate from the PDA 400's Audio Jack 403. Nevertheless, auxiliary jack 408 provides discrete, insulated electronic connections for each electronic lead of a phone plug to discrete, insulated electronic contacts of the device 401 and/or the PDA 400's Audio Jack 403, for, example, through more extended wiring or busses than would be necessary in embodiments discussed with reference to earlier figures, above. In turn, a strip/pin of device 401 may, itself, provide discrete, insulated electronic connections and discrete electronic leads to discrete, insulated electronic contacts of the PDA Audio Jack 403.

Figure 5:
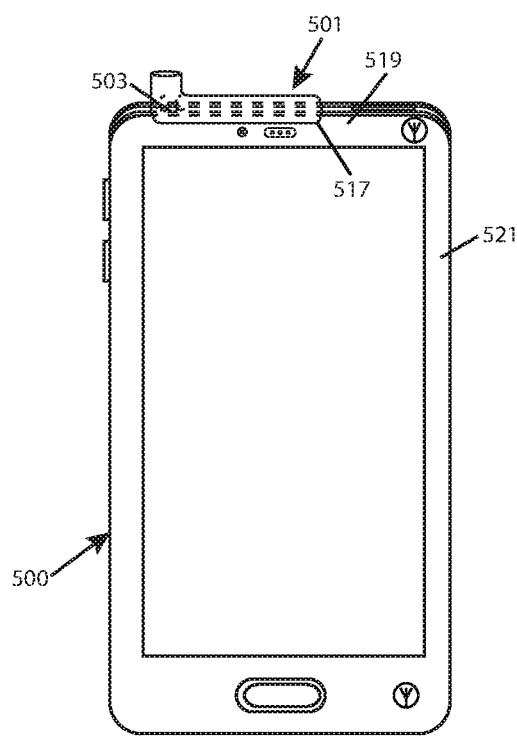
FIG. 5 is a front view of an example PDA similar to that discussed in reference to FIGS. 3 and 4 with a similar example peripheral device system as that shown in FIG. 4 installed into and able to communicate with the PDA through its Audio Jack, in accordance with some embodiments of the present invention.

FIG. 5 is a front view of the same PDA discussed in reference to FIGS. 3 and 4 (now 500) with the same peripheral device system 501 as that shown in FIG. 4 installed into and able to communicate with the PDA through its Audio Jack, now 503, in accordance with aspects of the present invention. Compared to the viewing angle of FIGS. 4 and 5, device 401 and the PDA have been rotated 180 degrees, on the vertical axis. From this rear view, the device 501 is shown with a much smaller viewable profile, which is almost negligible to a user, but some important additional aspects may still be better understood. For example, a slight gripping overhang 517 of the device 501's housing may be seen, which extends an inward-facing horizontal surface of device 501 (discussed previously as inward-facing side 105) vertically, downward, to a sufficient length that lateral (horizontal) pulling in of that overhang (into the page, negative Z-axis, from the perspective of the drawing) will result in pinching, gripping force against the edge 519, and/or front side 521 generally, of the PDA 500. As will be explained in greater detail below, some embodiments of the invention provide for applying such pinching, gripping force, on multiple sides or other parts of a PDA, to create superior mounting strength, while permitting the adjustment of the device 501 to fit a wide variety of PDA housing widths.

Figure 6:
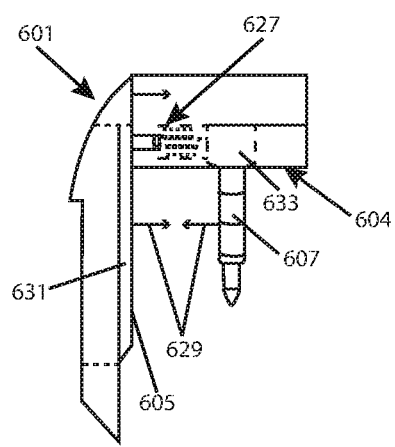
FIG. 6 is a side view of another example embodiment of a peripheral device system that may access the Audio Jack of a PDA, yet also provide external, additional access to the Audio Jack of the PDA, in accordance with embodiments of the present invention.

FIG. 6 is a side view of another embodiment of an exemplary peripheral device system 601 that may access the Audio Jack of a PDA, yet also provides external, additional access to the Audio Jack of the PDA, in accordance with aspects of the present invention. Device 601 is similar in profile and function to exemplary device 101, as discussed above. However, in addition, device 601 comprises at least one force-biased telescoping joint 627, connecting at least two laterally shiftable device sections: (1) a PDA-gripping device section 631 comprising a vertical, inward-gripping wall 605, and (2) a strip/plug section 633, comprising the strip/pin that may be variably inserted into an Audio Jack of a PDA. By creating inward-pinching lateral pressure, as shown by force arrows 629, force-biasing joint 627 may create gripping, mounting and holding pressure between device 601 and a PDA on which it is installed. In addition, although not pictured, a second such lateral force-biasing, inward-gripping joint may also join a third device section (to the right of the other two, from the perspective of the figure), comprising a gripping overhang (such as the overhang discussed with reference to FIG. 5, immediately above), to provide additional inward, gripping force on the other side of the PDA (from the side gripped by section 1/631). As an added advantage, these force-biased joints and sections allow force-biased lateral play outward, as well as inward, between the sections and, as a result, device 601 may grip and hold itself in an installed position on a wide variety of PDA devices, with widely differing widths and profiles.

In an exemplary method of using device system 601, a user installs device 601 onto a PDA or other computer system with a jack port by inserting his or her finger between device section 631 and interfacing pin or strip 607, extending telescoping joint 627 while threading pin or strip 607 into the jack port until pin or strip 607 is fully inserted into the jack port and a variable-length inward-facing surface 604 is pressed tightly against an upward-facing surface of the PDA or other computer system. The user may then release device 601 entirely, and the force-biasing of telescoping joint 627 draws gripping section 631 and strip or plug section 633 together. As the two sections pinch together, gripping wall 605 (which is preferably ridged and elastomeric) is pressed against an outer, vertical surface of the PDA or other computer system, holding device 601 in place while installed.

In some embodiments, device system 601 may also comprise an outer sliding switch on its outer surface, connected to pin or strip 607 through an open channel in the housing of device 601, allowing a user to extend telescoping joint 627 without directly contacting pin or strip 607, and enabling her or him to position pin or strip 607 optimally to fit the location of a jack port on the computer system. In other embodiments, device system 601 also comprises a control system, such as the control system set forth in reference to FIG. 13, connected to and able to communicate electronically with a sensor comprised in device system 601 and/or telescoping joint 627 (not pictured) and pin or strip 607. Thus, the control system comprised with the device 601 is able to monitor the degree of extension of joint 627, and, with software programming, infer whether device 601 has been installed (and whether it has been properly installed) on a particular computer system, and take further actions. For example, a user may program settings on the device's control unit (and/or the computer system) for the degree to which telescoping joint 627 is extended when installed on a particular device, and indicate to the control unit when it has been properly installed (for example, through a user interface on the computer system, or by pressing a button to confirm installation on a device and/or a display, e.g., an L.E.D. that flashes green when installed). Such further actions may include, allowing device 601 access to the computer system on which it is installed (and/or vice versa) and establishing wired and wireless networks between them. In some embodiments, such further actions only occur if the computer system on which device 601 is installed has been authorized and/or authenticated for using device 601, based on an authentication protocol (e.g., handshake between device 601 and the computer system on which it is installed). In another embodiment, such further actions may comprise device 601 (or the computer system on which it is installed) creating or accessing a wireless network for use by device 601 and/or a computer system on which it is installed. That wireless network may, and preferably does, include additional wireless devices. Thus, by sharing device 601 with another user, a user may provide quick, authenticated access to the wireless network. In a preferred embodiment, that wireless network may persist, after uninstalling device 601 from the computer system on which it is installed, through techniques set forth below in reference to other peripheral devices for establishing wireless networks.

It should be understood that, although the example of an audio pin is provided in the illustration of FIG. 6, this depiction is exemplary only. Innumerable alternative forms of physical interfaces between computer systems and peripheral devices may be used, alternatively or in addition to the particular examples for connections and interfaces set forth for teaching purposes in this application, while still falling within the scope of the invention. For example, any of the connectors and interfaces set forth elsewhere in this application, such as a U.S.B. or lightning plug or pin set, may also, or alternatively, be used rather than just an audio pin as 607.

FIG. 7 depicts a side- and partial cutaway view of an exemplary embodiment of a pin or strip 701 of a peripheral device that may aid such a device in variably mounting to, and establishing electronic communications with, a PDA or other portable computing device with a complementary Jack. The exemplary embodiment set forth with reference to this figure is one of several alternative possible embodiments, some of which will also be discussed, subsequent to this figure, but which are not exhaustive of the many different forms that fall within the scope of the invention. For simplicity, in each of these figures, the remainder (other than the pin or strip) of the peripheral device is omitted, but it should be understood that each such pin or strip is physically connected to the remainder of such a peripheral device, and strongly enough bound to it to provide mounting pressure to secure the device to a PDA, when the pin or strip is inserted into the Audio Jack of a PDA.

The exterior surface 703 of pin/strip 701 comprises conventional audio plug contacts 705, and insulating dividers 707 between those contacts. However, the interior of pin/strip 701 includes a partially hollow core 709, capable of receiving another audio plug (not pictured) optionally by expanding during entry, as necessary based on plug size (which expansion may be facilitated by a longitudinal or other cutaway(s) in pin or strip 701, and owing to the complementary inner contours of the core, capable of receiving such a plug. In addition, even though hollow core 709 preferably holds such an inserted plug in a position shifted away from the tip 711 of the pin/strip 701, inner contacts 713 and insulating inner dividers, examples of which are shown as 715, are placed in the correct position to make insulated, discrete contact with the outer surfaces of another audio plug, inserted in hollow core 709. In addition, electronic conduits between contacts 713 on the inner surface of hollow core 709 and contacts 705 on the exterior surface 703 of the pin/strip 701 may permit an inserted plug to maintain electronic communication with a PDA in which pin/strip 701 is mounted. At the same time, electrical wires, shown partially comprised within device connection 717 (partially shown and partially cutaway to reveal the relationship and omit unnecessary complication and obstruction by the remainder of the connected device), may flow discretely between the remainder of the peripheral device (not pictured) and any or all of the contacts 705 and/or 713, to selectively and discretely communicate with the PDA and/or inserted phone plug, as well as selectively relay signals between the phone plug and PDA, with or without further filtering, conditioning or other intermediate treatment of the signal. Alternatively (although not pictured, for simplicity in viewing) contacts 705 and 713 may be insulated from one another, but connected to the remainder of the device, which may so handle relaying and intermediate treatment of signals between the phone plug and PDA.

FIG. 8 depicts a perspective view of another exemplary embodiment of a pin or strip 801 of a peripheral device that may aid such a device in variably mounting to, and establishing electronic communications with, a PDA or other portable computing device with a complementary Jack. Pin or strip 801 comprises an at least semi-helical or otherwise wound, thin band with variable contacts and electronic leads, corresponding in position with the electronic contacts of an audio plug 803, on which it is shown installed. More specifically, contacts 805 of pin/strip 801 are shown pressing against contacts 807 of the audio plug 803. Insulation layers, such as the examples shown as 809, electronically isolate contacts (such as contacts 805) from other contacts and leads therefrom and may also (depending on the exact type, shape and size of pin or strip 801 and the Audio Jack) prevent direct connection of an audio plug with the contacts of an Audio Jack, into which both pin/strip 801 and/or audio plug 803 may be installed. Preferably, pin/strip 801 may be installed into an Audio Jack with or without a plug, such as 803, although, in some embodiments, a place-holding plug, or at least approximately phone plug-shaped and -sized filler, may be used in place of an audio plug, to maintain installation of pin/strip 801 into an Audio Jack in the absence of a plug, such as 803. Pin/strip 801 is preferably thin enough to permit the full insertion (and, therefore, installation) of both an audio plug, such as 803, and the pin/strip itself, but comprises sufficiently strong materials and structure to maintain installation of the remainder of a peripheral device, whether or not an audio/phone plug is also installed. Again, although a wound structure is shown for pin or strip 801, it should be understood that a wide variety of alternative thin or otherwise minimally-interfering (with respect to Audio Jack function) structures may, alternatively or in addition, be used to mount and provide communications for a device to a PDA, and otherwise carry out aspects of the present invention. For example, pin or strip 801 may also comprise a lattice or interconnected basket, and other movable barbing or other protrusions to variably fasten a device to a PDA.

FIG. 9 depicts a perspective view of another exemplary embodiment of a pin or strip 901 of a peripheral device that may aid such a device in variably mounting to, and establishing electronic communications with, a PDA or other portable computing device with a complementary Jack. Pin/strip 901 comprises a straight, thin band 905 with variable contacts and electronic leads, corresponding in position with the electronic contacts of an audio plug, such as the example shown as 903, on which it is installed, similar to the thin band discussed with reference to FIG. 8, except that it is in a straight, rather than helical, format. While the durability of this straight configuration of pin or strip 901 is desirable, it leads to the potential issue of uncontrolled lateral play when installed without a plug, such as 903 (or placeholder plug, as discussed above). To improve performance in this regard, two exemplary audio jack-interfacing rings are also provided: 907, which is connected to the band 905 approximately $\frac{2}{3}^{rds}$ of the way down its length, and 906, which is shown connected with, and forms a part of, an Audio Jack-holding cap 909, connected to the proximal end of the band 905, and also connected with electronic lead out-port 911, which provides a structural and isolated electronic connections (to each contact of band 905) to the remainder of the peripheral device (not pictured). Also shown reducing lateral play is a force-biased extension (e.g., springboard) 913, which maintains a hold via outward pressure, on the inside of an Audio Jack in which it is installed. In some embodiments, additional variable fasteners, which may include grooves or other complementarily-interfacing features, may link pin or strip 901 with plug 903 and/or an Audio Jack.

Figure 10:
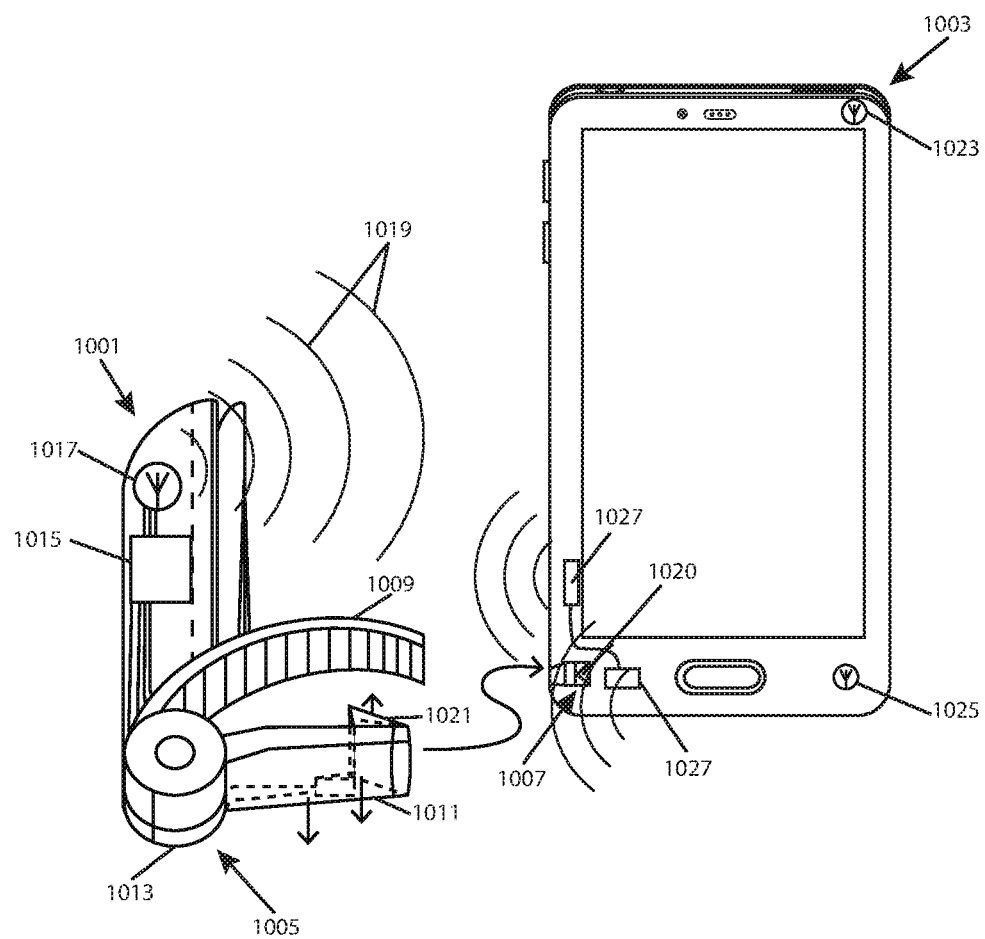
FIG. 10 depicts another embodiment of an example peripheral device system and its installation onto an example PDA with a specialized wireless docking port, in accordance with embodiments of the present invention.

FIG. 10 depicts another embodiment of an exemplary peripheral device system 1001 and its installation onto a PDA 1003 with a specialized wireless docking port 1007, in accordance with aspects of the present invention. In some aspects of the invention, a local, secure wireless connection may be established between a peripheral device and another computer system (such as PDA 1003) by the peripheral device and/or the computer system initiating such a secure network upon detecting relative coordinates and/or physical connections and connection conditions of a precise matching value (the precision of which may be by a variable setting of the system, which may be variably set by the system and/or user). For example, exemplary peripheral device 1001 comprises a securing clamp 1005, which may itself comprise two arms 1009 and 1011, linked by a rotary joint 1013. Clamp joint 1013 may comprise at least one actuator(s) and/or sensor(s) and/or a sensor/motor, and may be electronically connected to, and able to communicate with, a control system 1015, which may comprise a computer hardware and software control system. An example of such a computer hardware and software control system is provided in reference to FIG. 13, below. Control system 1015 may also be electronically connected to, and able to communicate with, an antenna 1017, such that the control system 1015 may communicate by sending encoded wireless signals, such as those examples shown as radio frequency waves 1019, over a wireless network, and may also initiate protocols for establishing a local, wireless network.

Similarly, PDA 1003's docking port 1007 (which may be an integral part or, or variably installed onto a PDA without causing permanent changes to the PDA) may comprise a physical actuator, in communication with a control system (not pictured). More specifically, docking port 1007 may comprise a variably-actuable tab 1020, which may depress/extend, or be depressed by, a tab 1021 on arm 1011 of the peripheral device 1001, which itself may be depressible/extendable variably-actuable by control system 1015. PDA 1003 may have traditional WiFi and other antennas, such as WiFi antennas 1023 and 1025. However, in addition, PDA 1003 may also comprise dedicated physical connection network antennas 1027, for establishing shorter-radius (which may be much lower powered) and or narrow directional wireless networks between PDA 1003 and peripheral devices—specifically, peripheral devices that have established an interlocked physical connection with the PDA and/or some physical coordinates of precisely matching values and/or common physical actuation and interaction, required by the PDA and/or peripheral control systems to establish such a wireless connection. Physical connection network antennas 1027 may do more than complete such a wireless connection, however. By including two such antennas, focused on two coordinate axes—as pictured—they may also be used as coordinate rangefinders for the PDA, and thereby assist in establishing the protocols and initial requirements for initiating the physical connection network. In some embodiments, the speed with with signals are returned, to each antenna 1027, itself may be used by a control system to infer the coordinate location of the peripheral device 1001, and determine whether it is in the coordinate position required to initiate communication (and the protocols for establishing a physically attached peripheral device network (a.k.a. physical connection network). Of course, a wide variety of additional or other positional and tab-actuation sensors and locators may, alternatively, be used to establish that the required docking position of a peripheral device system is present, and thereby triggering the initiation of a secure focused peripheral device network for establishing a secure wireless or otherwise restricted, protected network from intercession or other unauthorized aspects. In some embodiments, positional sensors on or about port 1020 or the PDA 1003 may receive multiple inward-facing position-indicating signals from system 1001 and, preferably, from at least two originating points surrounding the PDA on multiple sides, by directional sensors (or vice versa, with sensors on the system) to confirm the physical location of the peripheral device, triggering the granting of peripheral device network creation and/or access. Such network access may still be maintained with encryption, via protocols carried out by the system 1001 and PDA 1003, and the standards and other aspects of such protocols and encryption routines (such as passwords) may be briefly exchanged for creation of the peripheral device network only.

In some embodiments, both a wireless and wired connection may be maintained between PDA 1003 and peripheral device 1001, via physical contacts in port 1007 as well as antennas 1027 and 1017. In still other embodiments, a wireless connection, or a greater strength and constancy or less restricted in direction wireless network (as in a personal area network or WiFi) may be initiated upon decoupling peripheral device 1001 and PDA 1003. In this embodiment, the encryption key and other initiation and other protocols for creating and/or maintaining the network may be exchanged between the PDA and peripheral device just prior to disengagement, upon detecting initiated disengagement. Electronic contacts that maintain some connection for an amount of time sufficient for that transfer even while undergoing disengagement may be used for that purpose, or the protocols may be shared in advance, or a limited, short (e.g., unencrypted) protocol for that purpose may be exchanged just prior to and after initiation of disengagement, with the remainder of the required secure protocol being exchanged over a temporary, short distance network sufficient to accomplish exchange after disengagement, and, after expiry, the two devices may create the more permanent network using the exchanged protocols. This principle may be applied for the establishment of local networks for any other types of devices that are initially in hardwired communication but, after disengagement, may still require local network connection. Formally setting up such a connection can be painstaking, and users have already established trustworthiness to access the network by being granted permission to hardwire into the network. Thus, this aspect uses the fact of former hardwiring as evidence sufficient to grant encrypted wireless access, without further nuisances.

Figure 11:
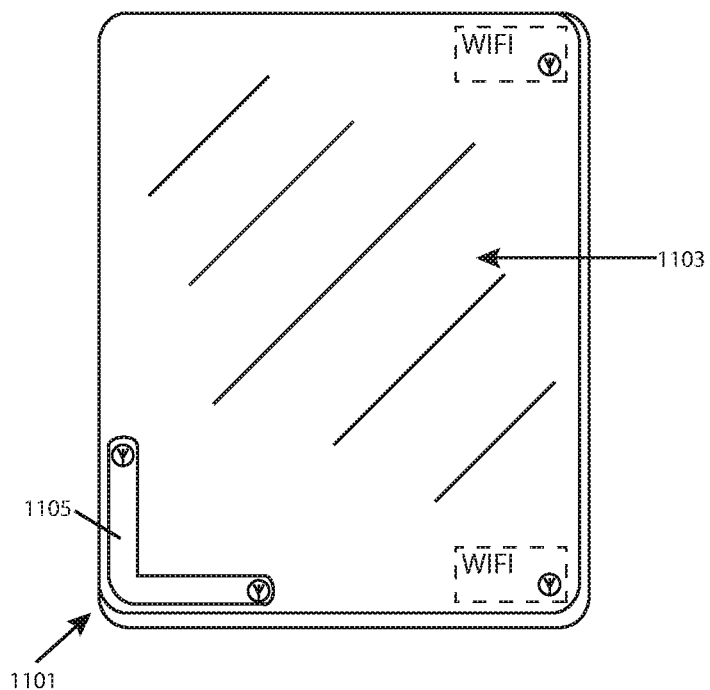
FIG. 11 depicts the front of an example tablet or other computer console, with an active matrix display screen, and a specialized network transceiver device for the establishment of a peripheral device network, in accordance with embodiments of the present invention.

FIG. 11 depicts the front of an exemplary tablet or other computer console 1101, with an active matrix display screen 1103, and a specialized network transceiver device 1105 for the establishment of a peripheral device network, in accordance with aspects of the present invention. Device 1105 may include a directional antenna, sensors, or an array of antennas and sensors for establishing, as discussed above with reference to antennas 1027, positional, device orientation and device physical interrelation triggered peripheral device networks. Once again, device 1105 is capable of determining unique locational information of a precision that is extremely difficult, if not impossible, to replicate with a hacking device, and may trigger and maintain a directionally restricted (in space) network exchange (signal directions emerging from both the console 1101 and any networked provisional device being so directionally restricted. In addition, shielding and reflectors in console 1101 and/or such a peripheral device may prevent leakage of the peripheral device network signals beyond the confines of their housings and serve to further confirm the authorized positioning and state of the peripheral device (not pictured in this figure.

Figure 12:
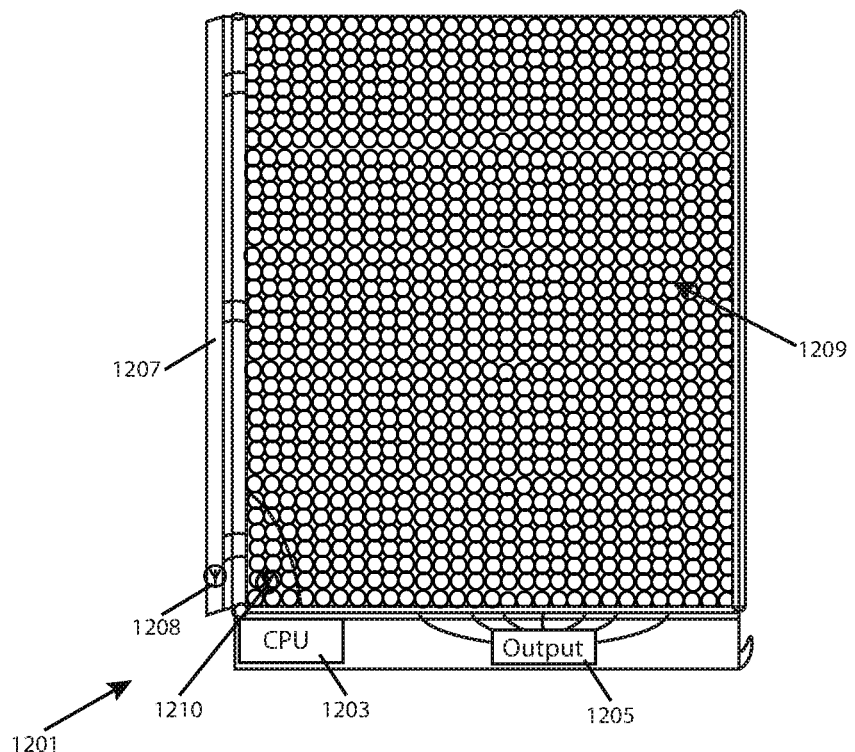
FIG. 12 depicts a new example form of peripheral device, which is a variable display overlay for altering the display type or otherwise augmenting the output of a display, such as the display of a computer console, as discussed with reference to FIG. 11, in accordance with some embodiments of the present invention.

FIG. 12 depicts a new form of peripheral device 1201, which is a variable display overlay for altering the display type or otherwise augmenting the output of a display, such as the display 1103 of console 1101, in FIG. 11. As with other peripheral devices for extending the capabilities of PDAs, consoles and other computer systems, device 1201 may comprise its own on-board CPU 1203 and other computer system aspects, such as an ouput and/or display driver 1205, and power source, but may, alternatively, derive power from an ambient source, and/or a connected console (such as 1101). To couple device 1201 with a console 1103 which it will serve as a peripheral device, and establish a peripheral device network, a user need only overlay peripheral device 1201 onto the screen (such as 1103) of a console 1101. By virtue of doing this, and, optionally, connecting a fastener (for example, magnetic clamp 1207) the console 1101 and/or device 1201 may mutually establish a precise directional collocation and orientation through a routine that excludes external interference (such as the protocols and routines discussed above for so establishing such peripheral device networks). For example, directional signals from two originating points/antennas 1208 and 1210, may provide the contained, multiple-directional signals required to satisfy directional efference conditions for establishing the peripheral device network, of directional transceiver 1105 and console 1101 (or vice versa). Because 1208 and 1210 may surround console 1101 on multiple sides, their signals may satisfy that exemplary requirement, discussed above, for establishing a peripheral device network. As a result, console 1101 may then authorize and be authorized to drive and control the output of an overlaid display 1209 of device 1201, and vice versa.

For example, device 1201 may create a specialized display output that is easier to read in highly illuminated ambient conditions—such as an e-ink display. Because console 1101 may have an LCD display, by contrast, it may be very difficult to view in such highly illuminated environment. As such, it may be desirable to overlay device 1201 onto console 1101, creating a peripheral device network between the two, after which point console 1101 may direct (and, optionally, provide power, which may be ambient power, for example, from its illuminated display) device 1201 to display the same information as would be displayed on its own display 1103, on the device display 1209. Conversely, device 1201 may instruct console 1101 to power down its display, to avoid wasting power, and perform other such management tasks (in reverse) of the console 1101. As another example, display 1109 may comprise galvanic resistance or other screen actuation transmitters or sensors, to transmit actuation gestures from a user to a console 1101. Such a device may, alternatively or in addition, be hardwired to a console 1101 and, in some embodiments, sensors on the inside (opposite the viewer) of display 1209 may instead read, transmit or amplify radiation or information from the screen 1103, transmitting a similar image through to the other side (facing the viewer of the figure).

The peripheral devices specifically discussed herein are exemplary only, and it should be understood that a wide variety of alternative peripheral devices, for virtually unlimited tasks and capabilities extensions may, alternatively or in addition, be used. In some embodiments, multiple peripheral devices may be established in the same peripheral device network or, alternatively, multiple peripheral device networks may be formed.

Figure 13:
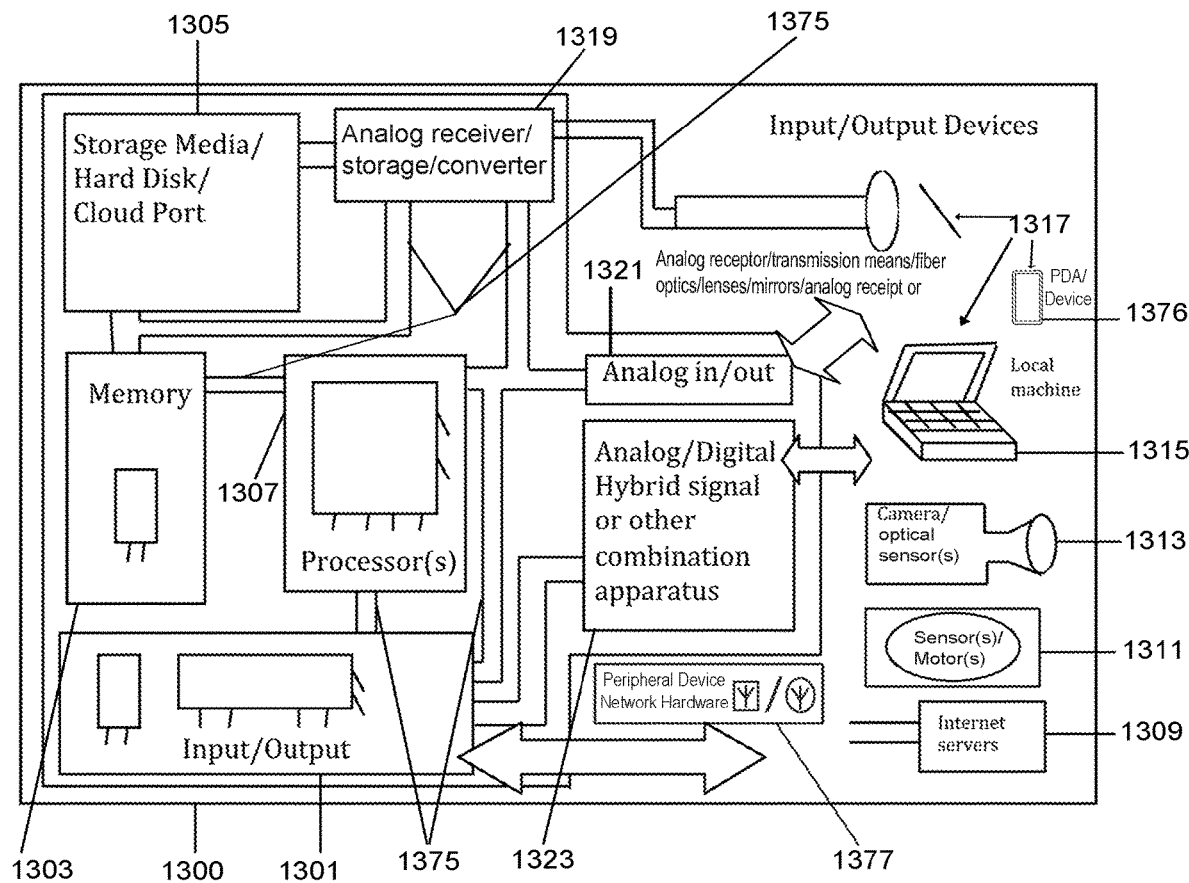
FIG. 13 is a schematic block diagram of some elements of an example control system that may be used in accordance with embodiments of the present invention.

FIG. 13 is a schematic block diagram of some elements of an exemplary control system 1300 that may be used in accordance with aspects of the present invention, such as, but not limited to, actuating sensors, motors, transceivers (including, not limited to, directional antennas and receivers), network protocols, secure encryption variable electrical connections, controlling and powering display and other devices devices, such as, but not limited to PDAs, and other actuators and/or signal an informational systems. The generic and other components and aspects described herein are not exhaustive of the many different systems and variations, including a number of possible hardware aspects and machine-readable media that might be used, in accordance with the present invention. Rather, the system 1300 is described to make clear how aspects may be implemented. Among other components, the system 1300 includes an input/output device 1301, a memory device 1303, storage media and/or hard disk recorder and/or cloud storage port or connection device 1305, and a processor or processors 1307. The processor(s) 1307 is (are) capable of receiving, interpreting, processing and manipulating signals and executing instructions for further processing and for output, pre-output or storage in and outside of the system. The processor(s) 1307 may be general or multipurpose, single- or multi-threaded, and may have a single core or several processor cores, including, but not limited to, microprocessors. Among other things, the processor(s) 1307 is/are capable of processing signals and instructions for the input/output device 901, analog receiver/storage/converter device 1319, analog in/out device 1321, and/or analog/digital or other combination apparatus 1323 to cause an interactive display and/or other user interface with controls, such as a wireless network beacon, such as a router) to be provided for use by a user on hardware, such as a personal computer monitor or PDA (Personal Digital Assistant) screen (including, but not limited to, monitors or touch- and gesture-actuable displays) or terminal monitor with a mouse and keyboard or other input hardware and presentation and input software (as in a software application GUI), and/or other physical controls. Alternatively, or in addition, the system, using processors 907 and input/output devices 1319, 1321 and/or 1323, may accept and exert passive and other physical (e.g., tactile) user and environmental input and output.

For example, and in connection with aspects of the invention discussed in reference to the remaining figures, the system may carry out any aspects of the present invention as necessary with associated hardware and using specialized software, including, but not limited to, controlling secure wireless and hardwired peripheral device networks and other communications, and implementing controls and power effectuated through such network system, and the networked devices or other computer systems. The system may also, among many other things described for control systems in this application, respond to user, sensor and other input (for example, by a user-actuated GUI controlled by computer hardware and software or by another physical control) to activate/deactivate recharging systems and pumps, store batteries and monitor their status in an inventory, exchange batteries and determine net power, capacity and other exchanges with users, or perform any other aspect of the invention requiring or benefiting from use of a control system. The system 1301 may also permit the user and/or system-variation of settings, including but not limited to the affects of user activity on modes of operation of the system, and send external alerts and other communications (for example, to users and administrators) via external communication devices, for any control system aspect that may require or benefit from such external or system-extending communications.

The processor 1307 is capable of processing instructions stored in memory devices 1303 and/or 1305 (and/or ROM or RAM), and may communicate with any of these, and/or any other connected component, via system buses 1375. Input/output device 1301 is capable of input/output operations for the system, and may include/communicate with any number of input and/or output hardware, such as a computer mouse, keyboard, entry pad, actuable display, networked or connected second computer, other UI aspects, camera(s) or scanner(s), sensor(s), sensor/motor(s), rangefinders, GPS systems, receiver(s), transmitter(s), transceiver(s), transflecting transceivers ("transflecters"), antennas, electromagnetic actuator(s), mixing board, reel-to-reel tape recorder, external hard disk recorder (solid state or rotary), additional hardware controls (such as, but not limited to, buttons and switches, and actuators, current or potential applying contacts and other transfer elements, light sources, speakers, additional video and/or sound editing system or gear, filters, computer display screen or touch screen. It is to be understood that the input and output of the system may be in any useable form, including, but not limited to, signals, data, commands/instructions and output for presentation and manipulation by a user in a GUI. Such a GUI hardware unit and other input/output devices could implement a user interface created by machine-readable means, such as software, permitting the user to carry out any of the user settings, commands and input/output discussed above, and elsewhere in this application.

1301, 1303, 1305, 1307, 1319, 1321 and 1323 are connected and able to communicate communications, transmissions and instructions via system busses 1375. Storage media and/or hard disk recorder and/or cloud storage port or connection device 1305 is capable of providing mass storage for the system, and may be a computer-readable medium, may be a connected mass storage device (e.g., flash drive or other drive connected to a U.S.B. port or Wi-Fi) may use back-end (with or without middle-ware) or cloud storage over a network (e.g., the internet) as either a memory backup for an internal mass storage device or as a primary memory storage means, or may simply be an internal mass storage device, such as a computer hard drive or optical drive.

Generally speaking, the system may be implemented as a client/server arrangement, where features of the invention are performed on a remote server, networked to the client and made a client and server by software on both the client computer and server computer. Input and output devices may deliver their input and receive output by any known means of communicating and/or transmitting communications, signals, commands and/or data input/output, including, but not limited to, input through the devices illustrated in examples shown as 1317, such as 1309, 1311, 1313, 1315, and 1377 and any other devices, hardware or other input/output generating and receiving aspects. Any phenomenon that may be sensed may be managed, manipulated and distributed and may be taken or converted as input or output through any sensor or carrier known in the art. In addition, directly carried elements (for example a light stream taken by fiber optics from a view of a scene) may be directly managed, manipulated and distributed in whole or in part to enhance output, and whole ambient light or other RF information for an environmental region may be taken by a series of sensors dedicated to angles of detection, or an omnidirectional sensor or series of sensors which record direction as well as the presence of electromagnetic or other radiation. While this example is illustrative, it is understood that any form of electromagnetism, compression wave or other sensory phenomenon may include such sensory directional and 3D locational information, which may also be made possible by multiple locations of sensing, preferably, in a similar, if not identical, time frame. The system may condition, select all or part of, alter and/or generate composites from all or part of such direct or analog image or other sensory transmissions, including physical samples (such as DNA, fingerprints, iris, and other biometric samples or scans) and may combine them with other forms of data, such as image files, dossiers or metadata, if such direct or data encoded sources are used.

While the illustrated system example 1300 may be helpful to understand the implementation of aspects of the invention, it is understood that any form of computer system may be used to implement many control system and other aspects of the invention—for example, a simpler computer system containing just a processor (datapath and control) for executing instructions from a memory or transmission source. The aspects or features set forth may be implemented with, and in any combination of, digital electronic circuitry, hardware, software, firmware, or in analog or direct (such as electromagnetic wave-based, physical wave-based or analog electronic, magnetic or direct transmission, without translation and the attendant degradation, of the medium) systems or circuitry or associational storage and transmission, any of which may be aided with enhancing media from external hardware and software, optionally, by wired or wireless networked connection, such as by LAN, WAN or the many connections forming the internet or local networks. The system can be embodied in a tangibly-stored computer program, as by a machine-readable medium and propagated signal, for execution by a programmable processor. The method steps of the embodiments of the present invention also may be performed by such a programmable processor, executing a program of instructions, operating on input and output, and generating output. A computer program includes instructions for a computer to carry out a particular activity to bring about a particular result, and may be written in any programming language, including compiled and uncompiled, interpreted languages, assembly languages and machine language, and can be deployed in any form, including a complete program, module, component, subroutine, or other suitable routine for a computer program.

Figure 14:
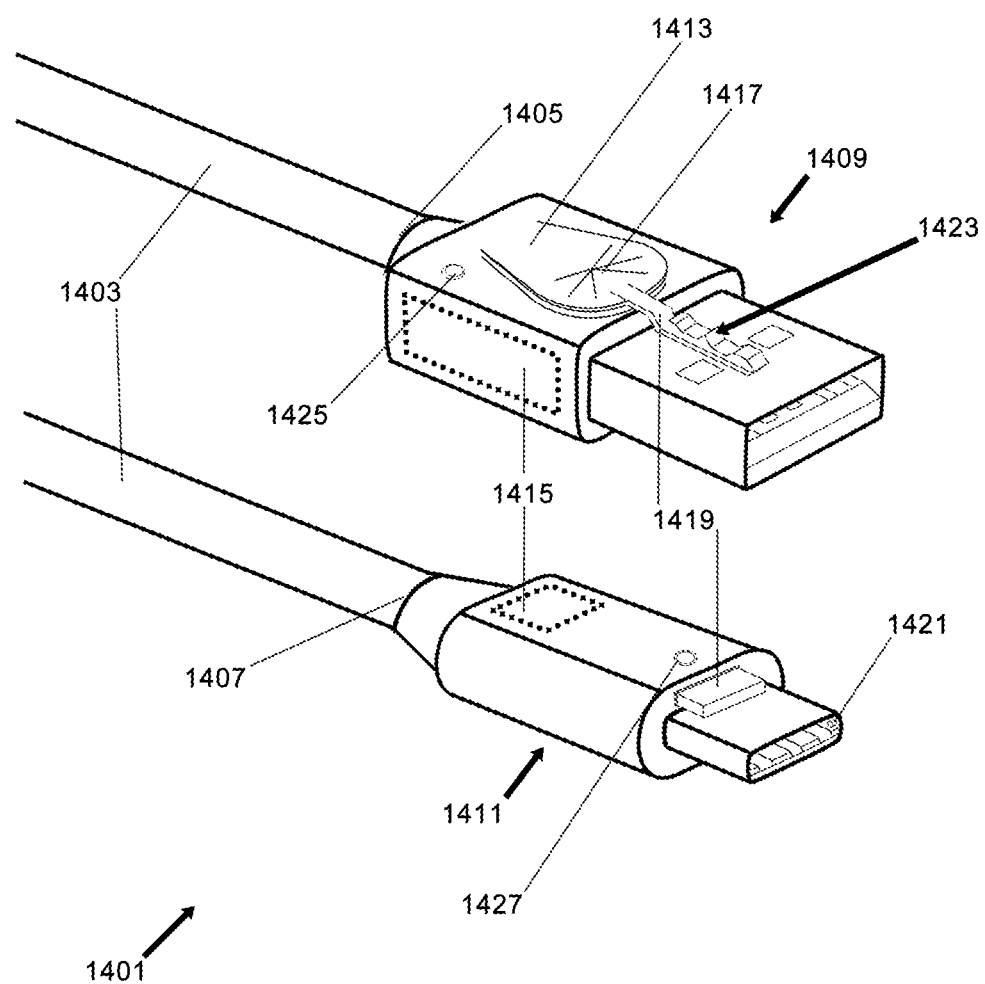
FIG. 14 is a partial perspective drawing depicting a new example form of communications cord device configured to interface with a computer system and additional computer systems, and create a dedicated encrypted wireless network, in accordance with some embodiments of the present invention.

FIG. 14 is a partial perspective drawing, depicting a new form of communications cord device 1401 configured to interface with a computer system comprising computer hardware (such as the control system set forth above with reference to FIG. 13) and additional computer systems comprising computer hardware (A.C.S.'s), and create a dedicated encrypted wireless network for such an A.C.S. Like other communications cords for interfacing with ports of computer hardware systems, cord device 1401 comprises a long, flexible length 1403 of bundled electrical and/or signal conducting conduits (such as wires). For ease of illustration and clarity, the entire length 1403 is not pictured. However, it should be readily understood that length 1403 may be any suitable, common and/or practical length for establishing physical, wired network between computer systems and/or their peripheral devices. It should also be understood that, in some embodiments, any number of such lengths, split or partially split and in communication with some or all of one another, may alternatively, or in addition, be used, as well as any number of ends of the length 1403 (pictured as 2-ended, also for ease of illustration). At each end, such as end 1405 and end 1407, aspects of a pin, set of pins, plug, receptacle and/or other suitable interface for communications cords is present. For example, end 1405 terminates with an exemplary large plug interface 1409 present, while end 1407 terminates with an exemplary smaller plug interface 1411. Interfaces 1409 and 1411, respectively, may comprise aspects meeting at least standards for such receptacles known as U.S.B. Type-C, comprising 24 internal pins, each electrically connected to, and able to communicate signals through, separate conductive wires (not pictured) within length 1403. In addition, however, several additional elements, altering the function of those Type-C features and creating additional functions, are also present.

First, cord device 1401 may comprise a user-actuable push-button 1413 within plug 1409 and, on-board control system(s) 1415, which may be a control system such as that set forth above, in reference to FIG. 13. In some embodiments, pushbutton 1413 may comprise a biometric data sensor 1417 (such as a blood-vessel or fingerprint pattern scanner). In any event, however, when depressed, pushbutton 1413 and/or control system 1415 (which may be connected with one another with wires or other conductors for communications) may signal to the control system 1415 or another control system interfacing with plug 1409 (or, in some embodiments, an interfacing master control system, which also may be a system such as that set forth in reference to FIG. 13, above), indicating that a user and/or control system seeks to establish a wireless network between the interfacing control system and an additional computer system (A.C.S.) Typically, a user and/or control system will do so by any or all of the following steps: connecting one of plugs 1409 and 1411 to such an interfacing control system (or, master control system), then connecting the other plug to such an additional computer system and/or then depressing button 1413 and clearing a user identification authentication routine, for example, via biometric sensor 1417, and/or completing a number of other authentication challenges or steps (such as an encryption key "handshake" negotiated by the control system(s) and/or an A.C.S.). However, in some embodiments, it will be sufficient that a user and/or control system has previously engaged in such steps, and simply returned to an effective area or space in which the a previously established wireless network has been established. Either way, the user has thereby first provided a physical connection and interface between the control system and the additional computer system through cable device 1401, establishing physical access and the level of trust that may imply, and then seeks to establish a wireless network, platforming off of encryption details (such as an encryption handshake) initiated in the wired connection and interface—albeit at different times. In some embodiments, those encryption details are partially provided externally but, preferably, the encryption handshake, including variable keys, are at least partially created locally, and at least partially by virtue of proprietary physical features of plug 1409 or 1411 and the A.C.S. interface. For example, in some embodiments, the initiation of the wireless network and the creation of a proprietary encryption key is triggered by and depends partly on the amount of depression of a tab or other probe, such as the examples pictured as 1419, when plug 1409 interfaces with the A.C.S., with its particular physical distances of its housing and other structural aspects of the interface. Thus, the cable device recognizes and conditions encryption details based on physical features of the particular A.C.S. As another example, either plug interface (e.g., smaller interface 1411) may also comprise a sensor or switch, which may be an internal sensor or switch 1421 within the interface or plug, which scans the distance from or other physical aspects of at least part of the interface component(s) of an A.C.S. when fully connected. In other embodiments, an onboard chip on either or both the A.C.S. and the plug 1409 or 1411 (for example, within either of device-local control systems 1415) may create aspects of the shared key for encryption. This key may then be run, and even further altered, in a later-created secure wireless network.

In some embodiments, the sensor(s) 1421 and probe(s) 1419 may also comprise a physical key, preventing the creation of an unauthorized physical connection (and the wireless connection resulting therefrom), in accordance with aspects of the present invention. For example, the probe 1419 of large plug interface 1409 may comprise a specific elaborate physical topography 1423 identifying it as an authorized device, by a user pressing it against probes or sensors on any control system to which it is connected (or vice versa, with a physical key topography on the control system to be connected, and sensors or probes present on the wireless network creation device 1401—or, in some embodiments, both simultaneously).

Thus, in accordance with the type of design set forth above, and many other alternative designs falling within the scope of the invention, the peripheral device 1401 may be used to create an immediate physical computer network between a master control system and an A.C.S., allowing a user to quickly access the network, while simultaneously creating a highly secure and specific wireless network negotiated in a restricted physical space, and tightly controlled by the master control system and virtually impossible to hack remotely. This is because the key created is random, and negotiated by known only to the physically connected computer systems. To facilitate that added security, the key is also preferably segregated (e.g., within separate device control systems 1415) from any memory accessible to the wireless network, which therefore may be extremely large, not to mention potential local elaboration or cycling of the key after handshake. An administrative user controlling the master control system may set up several rules, sets and types of users and authorized A.C.S.'s, defining the extent, priority and length of time of the wireless network access of each type of user—for example, using a user interface of the control system, such as a specialized touchscreen monitor, or a display with a keyboard and mouse.

Figure 15:
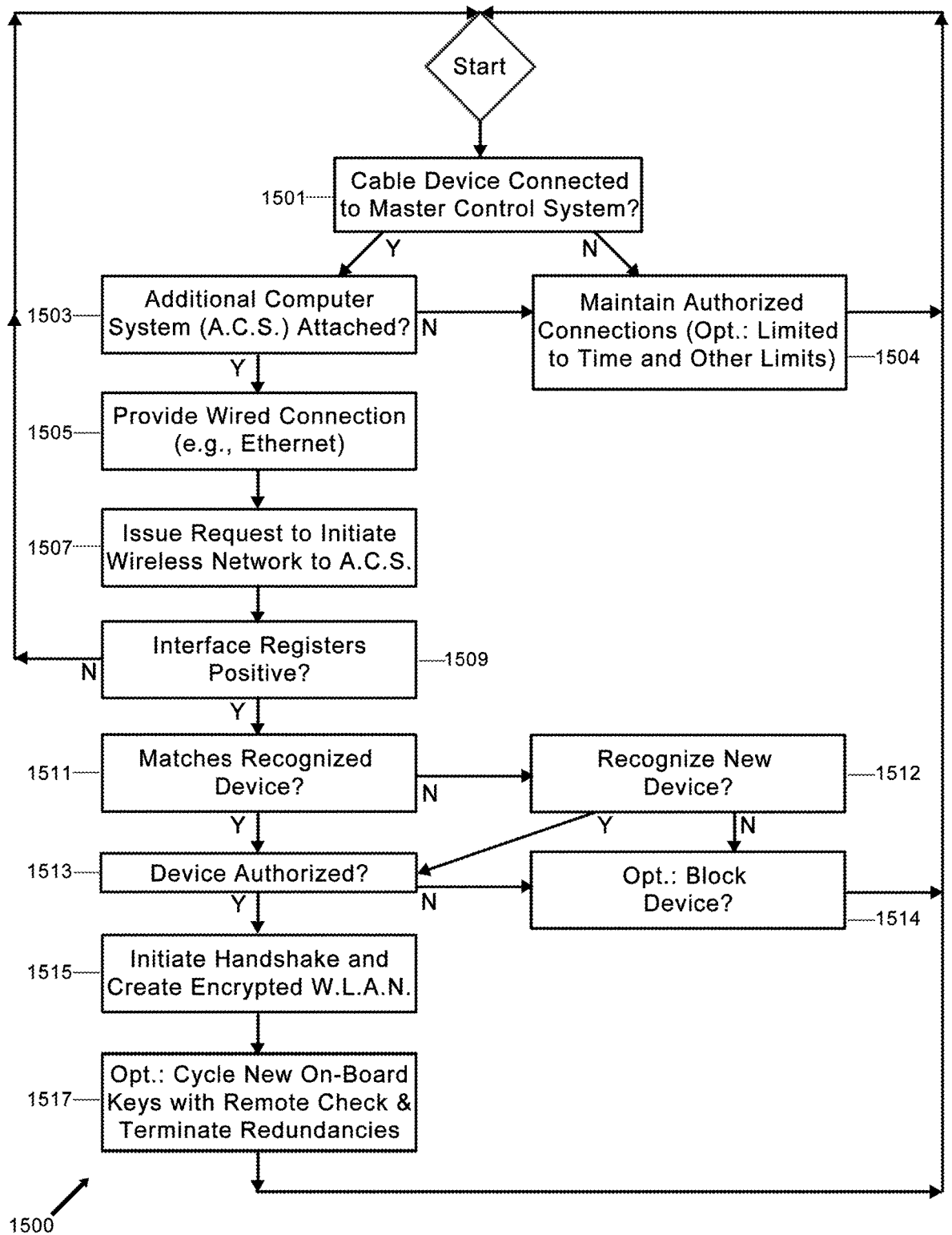
FIG. 15 is a process flow diagram depicting example steps that may be executed by a control system implementing example programming, methodology and other aspects of the present invention, in accordance with some embodiments.

FIG. 15 is a process flow diagram depicting exemplary steps 1500 that may be executed by a control system, such as the exemplary control system set forth above, in reference to FIG. 13, implementing exemplary programming, methodology and other aspects of the present invention. As mentioned above, with reference to FIGS. 6, 10 and 14, such a control system may control and be integrated with a peripheral device (such as communications cord device 1401 or device system 601) configured to establish wireless networks, and/or add computer systems to an existing wireless network. For example, such a control system may be used to create a wired network between at least two computer systems comprising computer hardware, such as a first or "master" control system, and a later-connected or additional computer system (an "A.C.S."), which a user seeks to add to a new or existing wireless network controlled by the master control system.

Beginning with step 1501, the control system determines whether the peripheral device it is controlling (such as cord device 1401) is physically connected to it, and able to receive and send communications to it, for example, via a wired connection. In some embodiments, the control system may also determine whether the peripheral device is sending or receiving power and, if so, from what source or supply or receive power from or to it (not pictured). In any event, if the peripheral device is so connected, which may be detected by wireless connection initiation hardware (such as triggers 1419 and/or 1421) the control system proceeds to step 1503. However, if the peripheral device is not connected, the control system may simply maintain any wireless and wired networks that have been previously authorized (optionally, within certain programmed time, usage or other limits to maintaining them) and return to the starting position in step 1504. Other than elapsed predetermined time periods, such limits may include conditions to types or degrees of network access. For example, if any "hacking" attempts are detected, such as attempts to access restricted files or computer systems, and the administrative user has set up rules accordingly, wireless network access may be discontinued.

Proceeding to step 1505, the control system may next provide access to itself and any computer network of which it is a part via the peripheral device and for the peripheral device, and, in some embodiments, for any A.C.S. or other device physically connected to the peripheral device through its communications connections interfaces (such as exemplary interfaces 1409 and 1411, or 607). In some embodiments, however, a protocol, password, passkey or other access challenge must be passed prior to granting such a wired connection for communications and/or power. For example, a physical key, such as ridged feature 1423 (discussed above) must fit into a physical lock on the control system or A.C.S. or be sensed to match a pattern for an authorized device by a sensor or probe comprised in the control system or A.C.S., only after which the master control system grants access through the physical connection to the network (for example, controlling switched connections to some or all of the conductive wires within cord 1403. Once physical network access has been granted to an A.C.S. through the peripheral device, the control system proceeds to a series of more elaborate steps, taking some additional time, to potentially establish a secure wireless connection, redundant with or replacing the wired, physical connection established in step 1505. In the first of those steps, step 1507, the A.C.S. or the master control system sends a command or request to the other, through the established physical connection through the peripheral device, to initiate the new wireless network (or alter an existing wireless network to include both the A.C.S. and the master control system). Next, at step 1509, the control system confirms whether attributes of the physical interface between the A.C.S. and the peripheral device is of a type for which wireless networks are permitted. For example, if the ridged features of 1423, or the interface's physical features sensed by sensor 1421 identify the A.C.S. as being a system, or within a class of systems, not permitted wireless access by the master control system, the master control system may not provide a wireless network to it, in accordance with steps set forth as 1512 et seq. If, however, those features do match and identify a known, or known type of, A.C.S. in step 1511, the master control system may proceed to step 1513, in which it determines whether the A.C.S. is authorized for the type of wireless connection requested. If the A.C.S. is not recognized in step 1511, the control system may determine whether to newly recognize it, in step 1512. For example, an administrator of the master control system may issue a command or create a set of rules for issuing such commands specific to particular types of A.C.S.'s, for example, using a G.U.I. of the master control system, to record and recognize the A.C.S. interfacing with the peripheral device, then proceeding also to step 1513. If the A.C.S. is not recognized as a new device for a wireless network, in step 1512, the master control system may return to the starting system. In some embodiments, it may also actively bar or block any further attempts at network access (in some embodiments, whether wired or wireless) in step 1514, prior to returning to the starting position. This again may be at the direction of an administrative user of the master control system, either by direct command or a set of pre-constructed rules based on the type of device or interaction detected by the master control system and/or peripheral device. If the A.C.S. is recognized as an authorized device for wireless network access in step 1513, the master control system may proceed to step 1515, in which it begins setting up a secure wireless connection for the A.C.S. to establish or join a secure wireless network, which is preferably dedicated to the A.C.S. (at least by exclusive encoding, according to a negotiated encryption key.) Such encryption keys and physically isolated negotiation are discussed in greater detail above, especially in reference to FIG. 14. At this point, a user may disconnect the physical interface of the A.C.S., and still enjoy wireless networked access to the master control system, and any other computer systems that may be within the created network of computer systems. (However, it should be noted in some embodiments, that access may be limited, as discussed in step 1504, in subsequent cycles of steps 1500, and, in some embodiments, an administrator may discontinue the wireless network or access at any time, via direct action or by implementing a set of usage rules.) In optional step 1517, the master control system may elaborate or cycle its negotiated encryption keys to create an even more secure wireless network, and may terminate redundant or duplicative wireless networks, unnecessarily covering the same A.C.S. more than once. In this way, the control system may reduce the risks and costs associated with data collision more efficiently.

Figure 16:
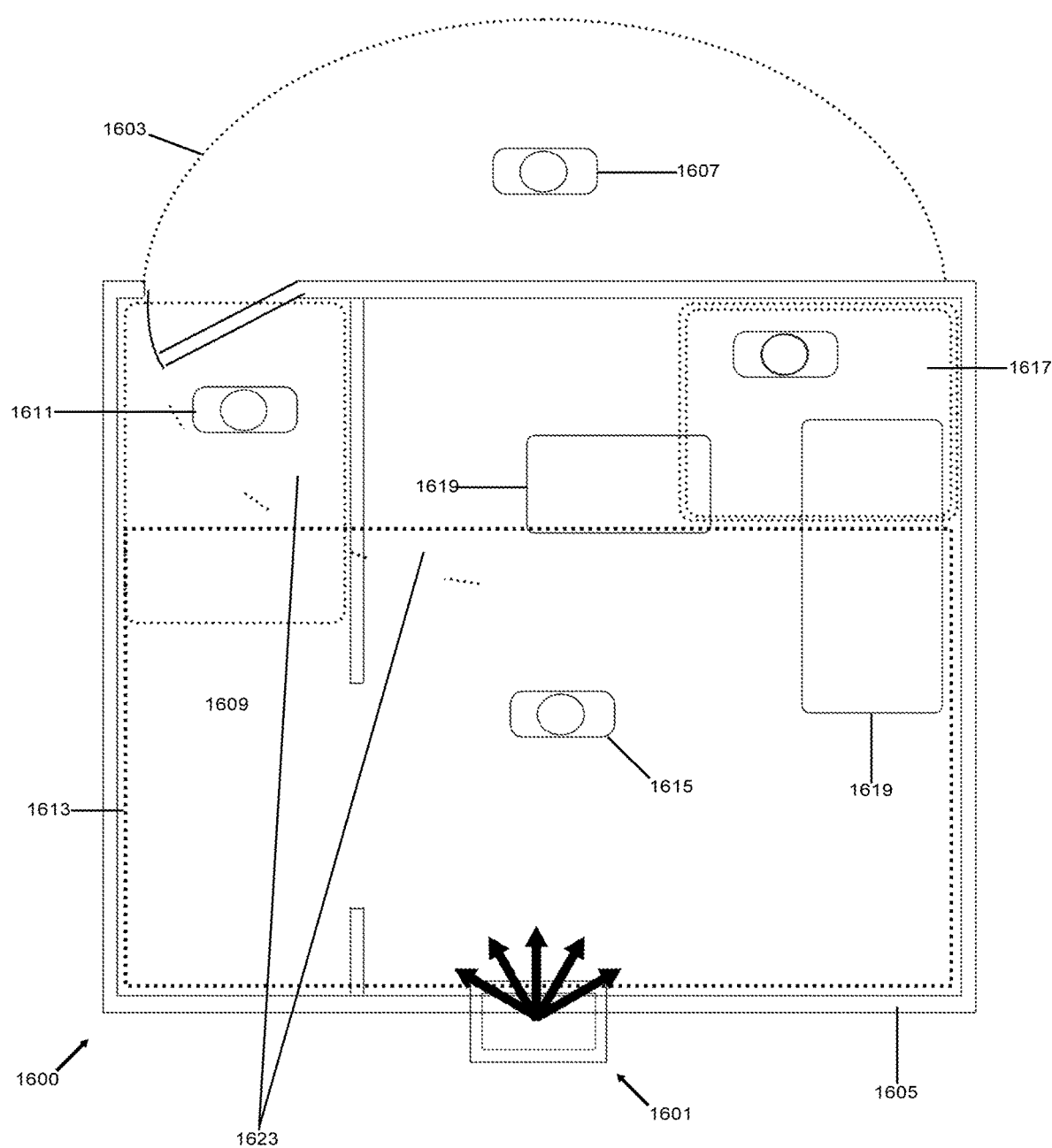

FIG. 16 is a top view of an example physical area 1600 covered by a plurality of wireless networks controlled by an example base station 1601, configured to create, provide and control access to user(s) to a plurality of wireless networks covering that example physical area 1600, in accordance with some embodiments of the invention. As with other devices set forth in the present application, base station 1601 may comprise, or be comprised within, a control system including computer hardware and software. For example, in some embodiments, such a control system may include, or be, any of the example control system(s) set forth in reference to FIG. 13, above, or any other control system discussed elsewhere in this application.

Base station 1601 is configured, by specialized hardware and software, to create one or more wireless networks, covering at least part of a physical area, such as physical area 1600, in some embodiments. In some embodiments, such parts of a physical area may be a pre-determined wireless network area, such as example outdoor wireless network area 1603, located on or about or near the outdoors of, or boundaries of, and/or curtilage of an example parcel of real estate 1605, in some example embodiments of the invention. Based on the presence of a user, such as example mailman 1607, located outdoors, within outdoor wireless network area 1603, a particular data security authorization may be provided to that user, allowing that user particular data and/or communications access, as will be discussed in greater detail below, in reference to example embodiments.

In some embodiments, base station 1601 includes hardware capable of establishing multiple secure wireless communications networks, including, for example, wireless networks serving users carrying devices (such as, but not limited to, PDAs) with wireless network communications hardware. In some embodiments, one or more of such multiple secure wireless communications networks is a secure network, permitting only authorized users to access the network and send and receive communications through base station 1601. In some embodiments, base station 1601 also controls further access to other networks with which base station 1601 maintains separate communications connections (e.g., the internet, through a wired connection).

In some embodiments, each of such multiple secure wireless communications networks has different parameters for providing data and/or communications access to users permitted access to that wireless communications network. For example, in some embodiments, base station 1601 provides one such wireless communications network to users classified as within a fourth (4th) class (or, lowest level of data and/or communications privileges) designation for wireless network access. In some such embodiments, such lowest level (fourth class) designation is assigned to any user identified and determined to be physically located within example outdoor wireless network area 1603. In some embodiments, the control system of base station 1601 may use physical location sensors, to determine that a user (such as mailman 1607) is located within outdoor wireless network area 1603, and, through programming associating that physical location as indicative of visitors to the property (but not necessarily greatly trusted users), the control system so designates and assigns such a lowest level of access. In some embodiments, such a user is further identified (e.g., by sensing and recording biometrics with a biometrics sensor, or, e.g., by receiving an identifier held by said user or her or his PDA, etc.) and data related to that identification is saved within the control system of the base station. In some embodiments, the user may be identified again, by again sensing such a user's identification, and comparing that identification to the previously stored identification, and determining that they match (or match within a certain confidence interval). In some such embodiments, such identifying again and determining may lead the base station 1601 to provide such a wireless communications network, with such access to data and/or communications access, to that user, regardless of whether that user is within outdoor wireless network area 1603 at that future time.

Similarly, in some embodiments, base station 1601 provides another such wireless communications network, with greater access to data and/or a wider range of communications, to users classified as within a third (3rd) class (or, second-lowest level of data and/or communications privileges) designation for wireless network access. In some such embodiments, such second-lowest level (third class) designation is assigned to any user identified and determined to be physically located within example entry zone wireless network area 1609, at or about a doorway to the inside of parcel of real estate 1605. In some embodiments, the control system of base station 1601 may use physical location sensors, to determine that a user (such as home services contractor 1611) is located within entry zone wireless network area 1609, and, through programming associating that physical location as indicative of visitors to the property trusted with some indoor access to the parcel of real estate, the control system so designates and assigns such a second-lowest level of access. In some embodiments, such a user is further identified (e.g., by sensing and recording biometrics with a biometrics sensor, or, e.g., by receiving an identifier held by said user or her or his PDA, etc.) and data related to that identification is saved within the control system of the base station. In some embodiments, the user may be identified again, at a future time, by again sensing such a user's identification, and comparing that identification to the previously stored identification, and determining that they match (or match within a certain confidence interval). In some such embodiments, such identifying again and determining may lead the base station 1601 to provide such a wireless communications network, with such greater access to data and/or a wider range of communications, to that user, regardless of whether that user is within entry zone wireless network area 1609 at that future time.

Similarly, in some embodiments, base station 1601 provides a third such wireless communications network, with an even greater access to data and/or a wider range of communications than the two networks set forth above, to users classified as within a second (2nd) class (or, second-highest level of data and/or communications privileges) designation for wireless network access. In some such embodiments, such second-highest level (second class) designation is assigned to any user identified and determined to be physically located within example main abode zone wireless network area 1613, at or about the center of parcel of real estate 1605. In some embodiments, the control system of base station 1601 may use physical location sensors, to determine that a user (such as visiting neighbor 1615) is located within main abode zone wireless network area 1613, and, through programming associating that physical location as indicative of visitors to the property trusted with central indoor access to the parcel of real estate, the control system so designates and assigns such a second-highest level of access. In some embodiments, such a user is further identified (e.g., by sensing and recording biometrics with a biometrics sensor, or, e.g., by receiving an identifier held by said user or her or his PDA, etc.) and data related to that identification is saved within the control system of the base station. In some embodiments, that user may be identified again, at a future time, by again sensing such a user's identification, and comparing that identification to the previously stored identification, and determining that they match (or match within a certain confidence interval). In some such embodiments, such identifying again and determining may lead the base station 1601 to provide access to such a third wireless communications network, with such greater access to data and/or a wider range of communications, to that user, regardless of whether that user is within main abode zone wireless network area 1613 at that future time.

Finally, (although, being an example, it should be understood that any number of such zones, users and wireless networks may be so provided, in various embodiments) in some embodiments, base station 1601 provides a fourth such wireless communications network, with an even greater access to data and/or a wider range of communications than the three networks set forth above, to users classified as within a first (1st) class (or, highest level of data and/or communications privileges) designation for wireless network access. In some such embodiments, such a highest level (first class) designation is assigned to any user identified and determined to be physically located within example inner zone wireless network area 1617, at or about an area of parcel of real estate 1605 which is physically difficult to access, and/or unlikely to be accessed, without permission or acquiescence from an owner of the parcel. For example, the example inner zone wireless network area 1617 is located behind example furniture 1619, making physical access on foot far more difficult, than for other areas. In some embodiments, the control system of base station 1601 may use physical location sensors, to determine that a user (such as family member of the parcel owner 1621) is located within inner zone wireless network area 1617, and, through programming associating that physical location as indicative of visitors to the property trusted with central indoor access to the parcel of real estate, the control system so designates and assigns such a highest level of access. In some embodiments, such a user is further identified (e.g., by sensing and recording biometrics with a biometrics sensor, or, e.g., by receiving an identifier held by said user or her or his PDA, etc.) and data related to that identification is saved within the control system of the base station. In some embodiments, that user may be identified again, at a future time, by again sensing such a user's identification, and comparing that identification to the previously stored identification, and determining that they match (or match within a certain confidence interval). In some such embodiments, such identifying again and determining a match may lead the base station 1601 to provide access to such a fourth wireless communications network, with such even greater access to data and/or an even wider range of communications, to that user, regardless of whether that user is within any particular wireless network area at that future time.

It is within the scope of the invention that users may be so identified and designated, as set forth above, in multiple classes, an provided different levels of data access, with multiple different networks provided by such a base station(s). It is also within the scope of the invention that a user may be simultaneously so identified and designated, by standing in overlapping zones, as shown by overlapping zone points 1623.

As mentioned above, a wide variety of alternative embodiments of the present invention will be apparent to those of skill in the art(s) relevant to the invention. For example, any aspect of the invention set forth above may be combined with any other aspect, in different numbers, combinations, orders and configurations, in various innumerable embodiments. Any such embodiments, among others, fall within the scope of the invention, and the recitation of any particular embodiments is for illustrative purposes, and does not limit the scope of the invention.

I claim:

1. A system for establishing a plurality of wireless networks, comprising:
   a control system, comprising computer hardware and software, and comprising hardware capable of establishing secure wireless communications networks;
   one or more location sensor(s), configured to determine one or more physical location(s) of a user moving through a plurality of locations within an area, wherein the one or more location sensor(s) comprise(s) one or more actuable location sensor(s), configured to be actuated by said moving, and wherein said one or more physical location(s) of a user is/are determined, at least in part, based on actuation of said one or more actuable location sensor(s);

wherein the computer hardware and software are configured to determine an identity of said user, based on said one or more physical location(s).

2. The system for establishing a plurality of wireless networks of claim 1, wherein said control system conditions access by said user to each of said secure wireless communications networks, based on said identity.

3. The system for establishing a plurality of wireless networks of claim 1, wherein the computer hardware and software are configured to determine a data security authorization of said user, based on said one or more physical location(s).

4. The system for establishing a plurality of wireless networks of claim 2, wherein the computer hardware and software are configured to determine a data security authorization of said user, based on said identity.

5. The system for establishing a plurality of wireless networks of claim 1, wherein the computer hardware and software provide access to one of said secure wireless communications networks to a user identified by said system.

6. The system for establishing a plurality of wireless networks of claim 5, wherein the computer hardware and software provide access to said one of said secure wireless communications networks to said user identified by said system, and classifies said user identified by said system as within a class of users.

7. The system for establishing a plurality of wireless networks of claim 6, wherein the computer hardware and software provide access to said one of said secure wireless communications networks to any user identified as within said class of users.

8. The system for establishing a plurality of wireless networks of claim 5, wherein the computer hardware and software provide access to said one of said secure wireless communications networks a second time, upon again identifying said user identified by said system.

9. The system for establishing a plurality of wireless networks of claim 8, wherein said again identifying said user identified by said system is based on biometrics.

10. The system for establishing a plurality of wireless networks of claim 1, wherein said system creates said secure wireless communications networks based on determining that a plurality of classes of users are present within said area.

11. The system for establishing a plurality of wireless networks of claim 1, wherein said system controls said secure wireless communications networks simultaneously.

12. The system for establishing a plurality of wireless networks of claim 1, wherein the one or more location sensor(s) is/are at least partially comprised within a peripheral device held by said user.

13. The system for establishing a plurality of wireless networks of claim 12, wherein the one or more actuable location sensor(s) comprise(s) one or more sensor(s) actuable by physical contact, and wherein said one or more physical locations of a user is/are determined, at least in part, based on actuation of said one or more sensor(s) actuable by physical contact.

14. The system for establishing a plurality of wireless networks of claim 13, wherein at least one of said one or more location sensor(s) comprises at least part of a fastener configured to fasten said peripheral device to a housing or other hardware of a computer system included within at least one of said secure wireless communications networks.

15. The system for establishing a plurality of wireless networks of claim 1, wherein said computer hardware and software is configured to determine said one or more physical location(s) of a user based on a docking and/or fastening condition between a peripheral device and another computer system included within at least one of said secure wireless communications networks.

16. The system for establishing a plurality of wireless networks of claim 1, wherein said user comprises a user device.

17. A method for establishing a wireless network, comprising the following steps:
providing a system comprising:
a control system, comprising computer hardware and software and comprising hardware capable of establishing secure wireless communications networks;
one or more location sensor(s), configured to determine one or more physical location(s) of a user moving through a plurality of locations within an area, wherein the one or more location sensor(s) comprise(s) one or more actuable location sensor(s), configured to be actuated by said moving, and wherein said one or more physical location(s) of a user is/are determined, at least in part, based on actuation of said one or more actuable location sensor(s);
wherein the computer hardware and software are configured to determine an identity of said user, based on said one or more physical location(s).

18. A system for establishing a plurality of wireless networks, comprising:
a control system, comprising computer hardware and software, and comprising hardware capable of establishing secure wireless communications networks;
one or more location sensor(s), configured to determine one or more physical location(s) of a user device within a plurality of locations within an area, wherein the one or more location sensor(s) comprise(s) one or more actuable location sensor(s), configured to be actuated by said user device being detected at said physical location(s), and wherein said one or more physical location(s) of a user is/are determined, at least in part, based on actuation of said one or more actuable location sensor(s);
wherein the computer hardware and software are configured to determine an identity of said user device, and provide access to one or more of said secure wireless communications networks, based on said one or more physical location(s).

19. The system for establishing a plurality of wireless networks of claim 18, wherein at least one of said secure wireless communications networks has a shorter range and/or lower power than at least one other of said secure wireless networks, and wherein said at least one of said secure wireless communications networks is within range of said user device.

20. The system for establishing a plurality of wireless networks of claim 18, wherein at least one of said secure wireless communications networks has a more limited direction of wireless communications transmissions than at least one other of said secure wireless communications networks, and wherein said at least one of said secure wireless communications networks is/are within range of said user device.

* * * * *